(12) United States Patent
Akbostanci et al.

(10) Patent No.: US 11,639,889 B2
(45) Date of Patent: May 2, 2023

(54) TESTING METHOD WITH PARTICLE EROSION FIRING FOR LOW AND HIGH VELOCITIES

(71) Applicant: ASELSAN ELEKTRONIK SANAYI VE TICARET ANONIM SIRKETI, Ankara (TR)

(72) Inventors: Mustafa Fatih Akbostanci, Ankara (TR); Ozgur Birer, Ankara (TR); Hansu Birol, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 263 days.

(21) Appl. No.: 17/136,056

(22) Filed: Dec. 29, 2020

(65) Prior Publication Data
US 2021/0208057 A1    Jul. 8, 2021

(30) Foreign Application Priority Data

Jan. 7, 2020   (TR) ............................ TR2020/00207

(51) Int. Cl.
*G01N 17/00*   (2006.01)
*G01N 3/56*    (2006.01)

(52) U.S. Cl.
CPC ............... *G01N 17/00* (2013.01); *G01N 3/56* (2013.01)

(58) Field of Classification Search
CPC .......... G01N 3/56; G01N 3/567; G01N 17/00; G01N 2203/001
See application file for complete search history.

(56) References Cited

U.S. PATENT DOCUMENTS

| | | | | |
|---|---|---|---|---|
| 3,756,155 A * | 9/1973 | Smith | ....................... | F42B 7/04 102/455 |
| 4,733,611 A * | 3/1988 | Janay | ....................... | F42B 5/03 102/501 |
| 4,949,644 A * | 8/1990 | Brown | .................... | F42B 7/046 102/501 |
| 6,722,283 B1 * | 4/2004 | Dindl | ..................... | F42B 5/145 102/370 |

(Continued)

FOREIGN PATENT DOCUMENTS

CN    204101423 U    1/2015
JP    2020169869 A  * 10/2020

OTHER PUBLICATIONS

Adler, W.F. and Boland, P. "Multiparticle Supersonic Impact Test Program", SPIE vol. 1326 Window and Dome Technologies and Materials II, pp. 2680276 (1990).*

*Primary Examiner* — Natalie Huls
(74) *Attorney, Agent, or Firm* — Bayramoglu Law Offices LLC

(57) ABSTRACT

A test method for determining impact effects and abrasion effects of particles such as rain, hail, dust, ice, sand, and micrometeoroids at speeds above Mach, i.e., higher than the speed of sound. The test method includes the steps of placement of balls in capsules, firing the capsules with a rifle firing system, hitting of the fired capsules and/or the balls to a target inside a firing range, recording the impact effects during a firing with a recording system, determining a durability and a lifetime of a test sample of test samples by calculating a number of the balls hitting the target and a number of shots providing an effect.

12 Claims, 1 Drawing Sheet

(56) References Cited

U.S. PATENT DOCUMENTS

| | | | |
|---|---|---|---|
| 7,127,933 B2 * | 10/2006 | Correia | G01N 3/48 73/12.11 |
| 7,278,290 B1 * | 10/2007 | Hughes | C09K 9/00 73/1.37 |
| 8,186,275 B1 * | 5/2012 | Woodall | F42B 12/50 102/513 |
| 2004/0112353 A1 * | 6/2004 | Stewart | G01N 3/567 124/17 |
| 2008/0209981 A1 * | 9/2008 | Daniels | G01N 3/567 73/12.04 |
| 2014/0318403 A1 * | 10/2014 | Amick | F42B 7/10 102/459 |
| 2017/0268858 A1 * | 9/2017 | Morse | F42B 7/08 |
| 2018/0172576 A1 * | 6/2018 | Young | G01N 17/002 |

* cited by examiner

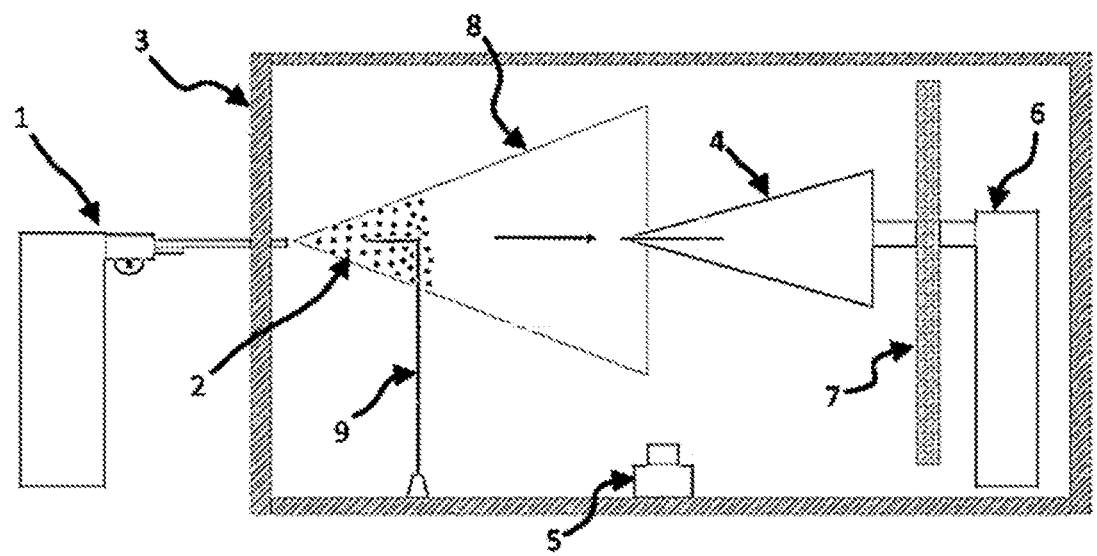

TESTING METHOD WITH PARTICLE EROSION FIRING FOR LOW AND HIGH VELOCITIES

CROSS REFERENCE TO THE RELATED APPLICATIONS

This application is based upon and claims priority to Turkish Patent Application No. TR2020/00207, filed on Jan. 7, 2020, the entire contents of which are incorporated herein by reference.

TECHNICAL FIELD

The invention relates to a test method for determining the effects of rain erosion at high velocities.

In particular, the invention relates to a test method for determining the impact and abrasion effects of particles such as rain, hail, dust, ice, sand, and micrometeoroids at speeds above 1 Mach, i.e., higher than the speed of sound or below.

BACKGROUND

Depending on the precipitation rate, the size and distribution of the raindrops, the rain has an erosive effect on objects moving in a rainy environment. The velocity of an object moving in a rainy environment also directly affects this effect. It is very difficult, very risky and very costly to measure the effect of rain erosion on moving objects, especially at speeds near and above Mach value and in rainy environments, and to perform these tests.

Today, rain erosion tests are carried out at supersonic speed levels, i.e., levels faster than the speed of sound. Some of these tests are performed with the water jet or rotating arm. Some of these simulation tests performed to test the effect of rain erosion are single shot tests and ballistic test methods. In these tests, a single bullet shot is made. In addition, rain erosion tests are carried out by shooting with compressed air.

In one of the known methods, rain erosion tests can be performed in test centers with structures accelerated on the rail. However, rain erosion tests can be performed at low speeds using wind tunnels, but tests to determine the effect of rain at supersonic speeds cannot be performed.

Among the existing techniques, the most important disadvantages of rail-rocket high speed tests are that they involve very large areas and high costs. Although rotating arm testers require a moderate investment, testing time is limited to minutes and only coupons can be tested. These coupons are small-scale test pieces that simulate the real system and consist of flat pieces, usually 1-5 cm$^2$ in size.

One of the known methods is single-shot tests, which are suitable for studying the effect of a grain impact, but are insufficient in verification tests related to life, multiple and consecutive grain impacts. In the tests performed with wind tunnels, problems are encountered when speeds close to and above 1 Mach value are reached. In water jet tests, problems are encountered in raising water particles to high velocities, and it is generally not possible to control the size and distribution of the hitting particles.

As a result of the literature survey, the application number CN204101423U was found. The utility model relates to a kind of aircraft high pressure weathering test unit. It is quite costly to provide the test simulated environment described in this document, which has the disadvantages mentioned above. There are difficulties in performing tests on different particle sizes or a mixture consisting of different particle sizes in the said document (for example, a mixture consisting of rain particles of 30% diameters of 0.5 mm, 40% by 1.5 mm, 30% by 2 mm diameters—samples can be replicated using different grain diameters and mixing ratios). Difficulties are encountered in the creation of tests due to the effects of evaporation, etc. as a result of the application of high speeds to the water particles. It does not allow the study of different collisions using various materials.

As a result, due to the above-mentioned drawbacks and the inadequacy of the existing solutions, an improvement in the technical field has been required.

SUMMARY

The invention is inspired by the existing circumstances and aims to solve the above-mentioned drawbacks.

The main purpose of the invention is to provide a method that enables the impact and abrasion effects of particles of different particle sizes such as rain, sand, dust, ice, and micrometeoroids to be tested at speeds of 1 Mach and above or below.

Another object of the invention is to simulate multiple, different size (particle sizes of different diameters such as 0.5 mm, 1 mm, 2 mm etc., mixtures of particles of different sizes in certain proportions—samples can be reproduced using different particle sizes and mixing ratios) and successive strokes of water droplets.

Another purpose of the invention is to provide the ability to make life tests depending on the precipitation rate, droplet size and distribution, flight speed, and duration.

Another purpose of the invention is to adjust the hitting speed depending on the amount of gunpowder. In this way, speeds above Mach can be reached easily with appropriate barrel and gunpowder.

Another purpose of the invention is to allow testing of test coupons as well as real-size systems.

Another purpose of the invention is to eliminate the need for high investment costs, resulting in tests at a lesser cost.

In order to fulfill the purposes mentioned above, the invention is a method that allows the testing of impact and wear effects of rain, sand, dust, ice and micrometeoroids of different particle sizes at high speeds above Mach, wherein; comprises the process steps of,
- placing the balls in the capsules,
- firing the aforementioned capsule with a rifle firing system,
- hitting of the fired capsule and/or balls to the target inside the firing range,
- recording the impact effects during firing with a recording system,
- determining the durability and lifetime of the test sample by calculating the number of balls hitting the target and the number of shots providing this effect.

The structural and characteristic features and all advantages of the invention outlined in the drawings below and in the detailed description made by referring to these FIGURES will be understood clearly, therefore the evaluation should be made by taking these FIGURES and detailed explanations into consideration.

BRIEF DESCRIPTION OF THE DRAWINGS

FIGURE is the view of the shooting range in which the test method of the invention is carried out and the firing system.

REFERENCE NUMBERS

1. Rifle firing system
2. Balls

3. Shooting range
4. Target
5. Recording system
6. Mounting bracket
7. Shield
8. Shot distribution cone
9. Spiked obstacle

DETAILED DESCRIPTION OF THE EMBODIMENTS

In this detailed description, the preferred structures of the test method of the invention are described only for a better understanding of the subject.

The invention comprises the steps of placing the balls (2) made of materials with the closest density to water instead of the lead balls in the shotgun cartridge and firing this cartridge towards the sample to be tested at speeds close to or above Mach value. The number of balls in the cartridge varies depending on the size of the balls used. The sizes of the balls (2) can be adjusted to have mixtures of different diameters and desired proportions of various diameters according to droplet sizes and, if desired, droplet size distribution.

In this test method, a special shotgun is used to accelerate the capsule and/or balls (2) above Mach speed. Depending on the test conditions, the material of the balls in the capsule can be selected or defined. For rain erosion testing, the material closest to the water density as much as possible can be selected. The balls produced from the selected material are inserted into the capsule. The capsules used in the tests are produced by replacing the lead balls in shotgun cartridges with balls made of materials closest to water properties. The number of balls (2) in the capsule varies depending on the dimensions used.

Using information such as rainfall rate, rain velocity, etc., the raindrop size and raindrop size distribution per cubic meter can be approximately calculated. Using this calculation, it is possible to estimate how long the moving object will travel in the rain and the number and size of droplets that will hit the object during this time. Using these calculated values and the number and distribution of the balls in a capsule, the number of shots to be made to have an effect similar to the size and distribution of raindrops can be calculated. Using these calculations, the size and number of droplets that will hit the object and the number of shots simulating this effect can also be calculated. Tests for the durability and lifespan of the test sample can be performed by conducting shooting tests in accordance with the calculated number of shots.

The test infrastructure, as shown in the FIGURE, consists of four main groups: rifle firing system (1), target (4), firing range (3) and recording system (5).

The rifle firing system (1) comprises a special capsule structure for test conditions. In the special capsule structure, balls (2) suitable for planned tests are placed. The most suitable capsule structure according to the test parameters is also formed by using balls (2) with different diameters and various distribution ratios. The muzzle velocity can be adjusted according to the type and amount of gunpowder power and the distance to the target (4). The shot rate of the balls (2) on the target (4) can also be determined depending on the dimensions of the shot distribution cone (8).

As a target (4), any real system or coupon matching the firing range (3) can be used. To test the target (4) at different angles of impact, it would be convenient to mount it with a mounting bracket (6) at different angles. The mounting bracket (6) is protected from shots by the protection shield-structure (7).

To prevent environmental damage during tests, the tests were conducted at a ballistically protected firing range (3). According to the requirements of the test environmental conditions, the weather inside the range can be conditioned.

By means of the recording system (5), impact effects during firings are recorded. The motion trajectory of the balls (2) during collision is recorded by the high-speed camera mounted outside the shot distribution cone (8).

This test method is used to test the impact and abrasion effects of various particle sizes such as rain, dust, ice, micrometeoroids, etc., at high speeds. As an example, to test the erosive effect of rain erosion, delrin (POM—Polyoxymethylene) balls with a density of 1.4 g/cm$^3$ and a diameter of 2 mm were selected among the materials closest to the density of water. Besides, balls made of materials such as silica are also selected. One capsule is filled with approximately 1000 delrin balls of 2 mm diameter. If desired, delrin balls with diameters of 0-10 mm in different proportions can be filled into the capsule. In assessing the impact of collisions, the sound propagation rate in the material can be taken into account in collisions at speeds above 1 Mach. Therefore, sound propagation rate can also be considered as a feature in material selection. This value is approximately 2400 m/s for delrin and 1500 m/s for water. The value of delrin is about 1.6 times that of water. This ratio can be evaluated as a safety coefficient. When its general properties are examined, delrin as a material is considered as a suitable material for balls to be used in tests.

Capsules filled with delrin balls were fired at a speed of approximately 400 m/s (more than 1 Mach) at the target (4) object. This speed can be increased or decreased depending on the gunpowder and barrel size.

The balls (2) in the cartridge are contained in a capsule. During the shot, the capsule moves with the balls inside at a high speed and hits the target. Since the shape, size and mass of the capsule are very different from the balls (2), the effects of the capsule and the balls are also very different. The balls in the capsule are in the form of 0.5 mm multiples such as 0.5 mm, 1 mm, 1.5 mm, and a mixture of various sizes and diameters can be obtained in a capsule. As an example, a 100% mixture can be obtained by mixing 30% of 0.5 mm diameter balls, 40% of 1 mm diameter balls, and 30% 1.5 mm diameter balls (2). Samples can be duplicated using different screen sizes and mixing ratios. In order to test the impact effect of only the balls (2), the impact of the capsule must be eliminated. Therefore, a structure is required to capture the capsule. To capture the capsule, a specially designed spiked obstacle (9) was used. Thus, only the balls (2) in the capsule are allowed to hit the target (4). Moreover, the balls can be tested in different shapes and forms (cube, pyramid, irregular shapes), apart from the spherical form, depending on which form of the material to be tested is desired to be tested according to the effect of the target (4) material.

This test method can also be used to test the effects of sand, dust or other particles on the target (4) at low velocity and high speed (above 1 Mach). In this case, it is sufficient to fill the capsule with balls produced from the material closest to the technical specifications of these materials. For example, it is recommended to use silica material as the shot material for sand. Tests can be conducted by adjusting the size of the balls according to the size and other properties of the sand.

Special measurement systems are also used for acoustic and pressure measurement in order to detect breaks and cracks that may occur on the target as a result of collision and to analyze the effects better. The firing range (3) can be conditioned according to environmental conditions such as temperature, humidity, pressure, etc., to be tested. In this way, tests can be performed under real environmental conditions.

The testing method described by the invention is a method that allows the testing of impact and abrasion effects of rain, sand, dust, ice, and micrometeoroids of different particle sizes at high speeds above Mach, wherein; comprises the process steps of,
- placement of the balls (2) in the capsules,
- firing the said capsule with a rifle firing system (1),
- hitting of the fired capsule and/or balls (2) to the target (4) inside the firing range (3),
- recording the impact effects during firing with a recording system (5),
- determining the durability and lifetime of the test sample by calculating the number of balls hitting the target (4) and the number of shots providing this effect.

In addition, it also includes the process steps of testing the target by selecting the balls in different sizes, testing the target (4) by selecting the balls in different sizes and various ratios, determining the hitting rate of the balls (2) depending on the size of the shot distribution cone (8), capturing the capsule to test the effect of only the balls (2) by using the spiked obstacle (9) and eliminating the impact, testing the target (4) with the mounting bracket (6) at different impact angles, protecting the said mounting bracket (6) from shots with the protection shield (7), conditioning the firing range (3) with temperature, humidity, pressure and making it suitable for the environmental conditions desired to be tested.

What is claimed is:

1. A method for simulating impact effects and abrasion effects in an environment of a rain, a sand, a dust, an ice or micrometeoroids of different particle sizes at speeds above Mach or at speeds below Mach, comprising the process steps of:
    - placement of balls in capsules,
    - firing the capsules with a rifle firing system to obtain fired capsules,
    - capturing the capsules using a spiked obstacle to test the effect of only the balls and eliminating impact effects of fired capsules,
    - hitting of the balls to a target inside a firing range,
    - recording the impact abrasion effects on the target during a firing with a recording system, and
    - determining a durability and a lifetime of a test sample used as the target in the environment at speeds above Mach or below Mach by providing a number of the balls hitting the target and a number of fired capsules shots calculated to provide impact effects and abrasion effects equivalent to the rain, sand, dust, ice, or micrometeoroids of different particles sizes of the environment, and assessing the recorded impact abrasion effects on the target.

2. The method according to claim 1, further comprising the process step of testing the target by selecting the balls in different sizes.

3. The method according to claim 2, further comprising the process step of selecting the different sizes of the balls in a form of 0.5 mm and multiples of 0.5 mm.

4. The method according to claim 3, further comprising the process step of obtaining a mixture of 100% in total by mixing the balls of 0.5 mm and the multiples of 0.5 mm in different proportions.

5. The method according to claim 1, further comprising the process step of testing the target by selecting the balls in different sizes and various ratios.

6. The method according to claim 5, further comprising the process step of obtaining a mixture of 100% in total by mixing the balls of 0.5 mm and multiples of 0.5 mm in different proportions, and reproducing the test samples by using various ball sizes and mixing ratios.

7. The method according to claim 1, further comprising the process step of determining of a shot rate of the balls on the target depending on dimensions of a shot distribution cone.

8. The method according to claim 1, further comprising the process step of testing the target with a mounting bracket at different impact angles.

9. The method according to claim 8, further comprising the process step of protecting the mounting bracket from the shots with a protection shield.

10. The method according to claim 1, wherein the balls are produced from material selected from the group consisting of polyoxymethylene (POM) and silica.

11. The method according to claim 1, further comprising the process step of making the firing range suitable for environmental conditions of the environment desired to be tested by conditioning the fire range with a temperature, a humidity and a pressure.

12. The method according to claim 1, further comprising the process step of testing target materials in different shapes and forms, wherein the different shapes and forms comprise cube, pyramid and irregular shapes, apart from a spherical form depending on the effect of an abrasive material.

* * * * *